United States Patent
Oh et al.

(10) Patent No.: US 9,860,903 B2
(45) Date of Patent: Jan. 2, 2018

(54) METHOD AND APPARATUS FOR CONTROLLING INTERFERENCE IN CARRIER AGGREGATION SYSTEM

(71) Applicant: Electronics and Telecommunications Research Institute, Daejeon (KR)

(72) Inventors: Sang Chul Oh, Daejeon (KR); Kyung Sook Kim, Daejeon (KR); Byung-Han Ryu, Daejeon (KR); Yeon Seung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 14/726,778

(22) Filed: Jun. 1, 2015

(65) Prior Publication Data
US 2015/0373725 A1 Dec. 24, 2015

(30) Foreign Application Priority Data
Jun. 18, 2014 (KR) .......................... 10-2014-0074532

(51) Int. Cl.
*H04W 72/08* (2009.01)
*H04L 5/14* (2006.01)
*H04L 5/00* (2006.01)
*H04W 36/06* (2009.01)

(52) U.S. Cl.
CPC .......... *H04W 72/082* (2013.01); *H04L 5/001* (2013.01); *H04L 5/14* (2013.01); *H04L 5/0062* (2013.01); *H04W 36/06* (2013.01)

(58) Field of Classification Search
None
See application file for complete search history.

(56) References Cited

U.S. PATENT DOCUMENTS

| 2010/0232373 | A1* | 9/2010 | Nory ................. H04W 72/1289 370/329 |
| 2012/0263128 | A1 | 10/2012 | Hu et al. |
| 2013/0021929 | A1 | 1/2013 | Kim |
| 2013/0107826 | A1* | 5/2013 | Dinan .................. H04W 16/32 370/329 |
| 2014/0341018 | A1* | 11/2014 | Bhushan .......... H04W 28/0289 370/230 |

FOREIGN PATENT DOCUMENTS

KR 1020120085833 A 8/2012

* cited by examiner

*Primary Examiner* — Hassan Kizou
*Assistant Examiner* — Ashil Farahmand
(74) *Attorney, Agent, or Firm* — William Park & Associates Ltd.

(57) ABSTRACT

A base station of a carrier aggregation system performs interference control of a first component carrier in which interference exceeds a threshold value among a plurality of component carriers based on an ABS pattern and changes the first component carrier to an available new component carrier, when interference of the first component carrier exceeds a threshold value after the interference control is performed.

17 Claims, 8 Drawing Sheets

FIG. 4

METHOD AND APPARATUS FOR CONTROLLING INTERFERENCE IN CARRIER AGGREGATION SYSTEM

CROSS-REFERENCE TO RELATED APPLICATION

This application claims priority to and the benefit of Korean Patent Application No. 10-2014-0074532 filed in the Korean Intellectual Property Office on Jun. 18, 2014, the entire contents of which are incorporated herein by reference.

BACKGROUND OF THE INVENTION (a) Field of the Invention

The present invention relates to a method and apparatus for controlling interference in a carrier aggregation system. More particularly, the present invention relates to a method and apparatus for controlling interference that can minimize interference between terminals in a system that aggregates and uses component carriers operating with a frequency division duplex (FDD) method and a time division duplex (TDD) method.

(b) Description of the Related Art

A carrier aggregation system is a system that aggregates at least one component carrier having a smaller bandwidth than a target wideband to form a wideband, when a wireless communication system attempts to support a wideband.

In the carrier aggregation system, the term "serving cell" may be used instead of the term "component carrier". Here, a serving cell is formed with a pair of component carriers such as a downlink component carrier and an uplink component carrier, or is formed with only a downlink component carrier. The carrier aggregation system is a system in which a plurality of serving cells, i.e., a plurality of component carriers, are set to a terminal. Therefore, the terminal may transmit and receive data through a plurality of component carriers.

In such a carrier aggregation system, when terminals that are connected to different base stations in close proximity use a component carrier of the same frequency domain, interference between the terminals that are connected to the different base stations occurs. In order to reduce such interference, an almost blank subframe (ABS) pattern is used. The ABS pattern is a subframe pattern including an ABS. However, interference may not be reduced with an ABS pattern. Further, each component carrier has an intrinsic cell identifier, and an ABS pattern exists on a cell identifier basis. In this way, because an ABS pattern should be generated on a component carrier basis, much time is consumed in generating the ABS pattern.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for controlling interference in a carrier aggregation system, having advantages of more simply generating an ABS pattern for interference control in a carrier aggregation system and additionally reducing interference when interference is not solved with only application of an ABS pattern.

An exemplary embodiment of the present invention provides a method in which a base station of a carrier aggregation system that aggregates and communicates with a plurality of component carriers controls interference between terminals. The method includes: determining whether a component carrier in which interference exceeds a threshold value exists in the plurality of component carriers; performing almost blank subframe (ABS) pattern-based interference control of a first component carrier in which interference that exceeds the threshold value has occurred; and changing, if interference of the first component carrier exceeds the threshold value after the interference control, the first component carrier to an available new component carrier.

The changing of the first component carrier may include changing, when the first component carrier is a primary component carrier, the first component carrier to the available new component carrier through handover.

The changing of the first component carrier may include removing, when the first component carrier is a secondary component carrier, the first component carrier and using the available new component carrier as the secondary component carrier.

The plurality of component carriers may include a plurality of frequency division duplex (FDD) component carriers operating with an FDD method and a plurality of time division duplex (TDD) component carriers operating with a TDD method, and the ABS pattern may include a first ABS pattern of the plurality of FDD component carriers and a second ABS pattern of the plurality of TDD component carriers.

The performing of an almost blank subframe (ABS) pattern-based interference control may include scheduling a terminal that is connected to the base station at a subframe segment instead of an ABS based on information of the ABS pattern.

The performing of an almost blank subframe (ABS) pattern-based interference control may include: generating the ABS pattern; and transmitting the ABS pattern to a neighboring base station.

The performing of an almost blank subframe (ABS) pattern-based interference control may further include scheduling, by the neighboring base station, a terminal that is connected to the neighboring base station at a segment corresponding to an ABS based on information of the ABS pattern.

The generating of the ABS pattern may include: generating a downlink data bit map based on downlink data transmission for immediately preceding continuous frames; generating an MBSFN downlink bit map based on an MBMS single frequency network (MBSFN) subframe that is allocated for a multimedia broadcast multicast service (MBMS); and generating the ABS pattern of the plurality of component carriers using the downlink data bit map and the MBSFN downlink bit map.

The generating of the ABS pattern may include determining each bit of the ABS pattern by performing a NOR operation of each bit of the downlink data bit map and each bit of the MBSFN downlink bit map.

Each bit of the downlink data bit map and the MBSFN downlink bit map may represent whether data is transmitted in each subframe corresponding to the each bit.

Another embodiment of the present invention provides an interference control apparatus that controls interference between terminals in a carrier aggregation system that aggregates and communicates with a plurality of component carriers. The interference control apparatus includes a receiver and an interference manager. The receiver receives interference information in a plurality of component carriers that are allocated to a terminal from the terminal. The interference manager performs interference control based on an ABS pattern of a first component carrier in which interference exceeds a threshold value among the plurality of component carriers, performs interference control based on the ABS pattern, and changes the first component carrier to an available new component carrier when interference of the first component carrier exceeds the threshold value.

The interference manager may change a primary component carrier to the available new component carrier when the first component carrier is a primary component carrier.

The interference manager may remove the first component carrier when the first component carrier is a secondary component carrier and use the available new component carrier as the secondary component carrier.

The interference control apparatus may further include an ABS pattern generator that generates the ABS pattern.

The ABS pattern generator may generate a downlink data bit map based on downlink data transmission for immediately preceding continuous frames, generate an MBSFN downlink bit map based on an MBMS single frequency network (MBSFN) subframe that is allocated for a multimedia broadcast multicast service (MBMS), and generate the ABS pattern using the downlink data bit map and the MBSFN downlink bit map.

The ABS pattern generator may determine each bit of the ABS pattern according to a NOR operation result of each bit of the downlink data bit map and each bit of the MBSFN downlink bit map.

The interference manager may schedule downlink transmission and uplink transmission of a terminal that is connected to the base station at a subframe segment instead of an ABS based on the ABS pattern.

The interference control apparatus may further include a transmitter that transmits the ABS pattern to a neighboring base station, wherein the neighboring base station may schedule downlink transmission and uplink transmission of a terminal that is connected to the neighboring base station at a segment corresponding to an ABS based on the ABS pattern.

BRIEF DESCRIPTION OF THE DRAWINGS

FIG. 4 is a diagram illustrating general ABS pattern information.

DETAILED DESCRIPTION OF THE EMBODIMENTS

Figure 1:
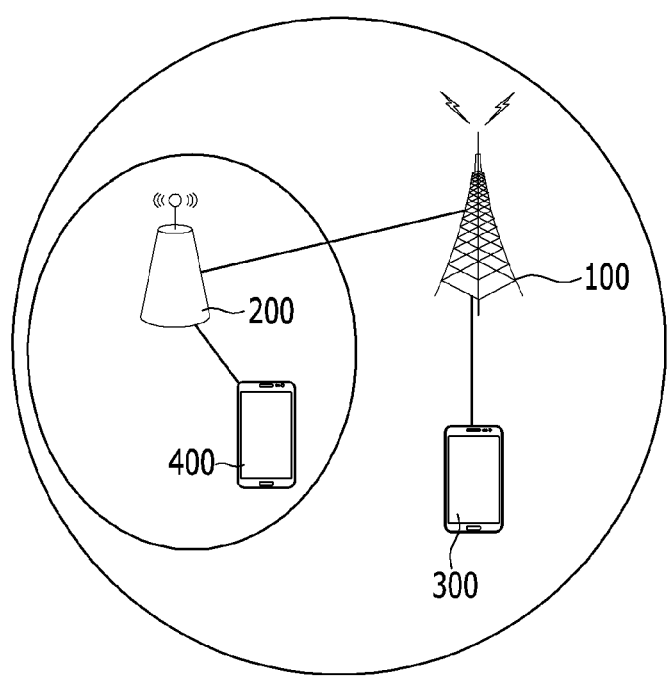
FIG. 1 is a diagram illustrating an example of a carrier aggregation system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small-sized BS [a femto BS, a home node B (HNB), a home eNodeB (HeNB), a pico BS, a metro BS, and a micro BS] and include an entire function or a partial function of the ABS, the nodeB, the eNodeB, the AP, the RAS, the BTS, the MMR-BS, the RS, the RN, the ARS, the HR-RS, and the small-sized BS.

Hereinafter, a method and apparatus for controlling interference in a carrier aggregation system according to an exemplary embodiment of the present invention will be described in detail with reference to the drawings.

FIG. 1 is a diagram illustrating an example of a carrier aggregation system according to an exemplary embodiment of the present invention.

Referring to FIG. 1, a carrier aggregation system is a wireless communication system that aggregates a plurality of component carriers to form a wideband.

The carrier aggregation system may include at least one of base stations 100 and 200. The base stations 100 and 200 provide a communication service to terminals 300 and 400 within a cell that each of the base stations 100 and 200 manages. For this reason, the base stations 100 and 200 each manage a plurality of component carriers and allocate a component carrier to the terminals 300 and 400. The base stations 100 and 200 determine the number of available component carriers of the terminals 300 and 400, and allocate a component carrier to each of the terminals 300 and 400 based on number information of available component carriers of the terminals 300 and 400. A plurality of component carriers may include a component carrier (hereinafter referred to as an "FDD component carrier") operating with a frequency division duplex (FDD) method and a component carrier (hereinafter referred to as a "TDD component carrier") operating with a time division duplex (TDD) method. The component carrier may be classified into a primary component carrier and a secondary component carrier.

The terminals 300 and 400 may use only a primary component carrier of component carriers that are allocated from the base stations 100 and 200, or may use at least one secondary component carrier together with a primary component carrier.

When the terminals 300 and 400 use a component carrier of the same frequency domain in close proximity, interference between the terminals 300 and 400 may occur. For such interference control between the terminals 300 and 400, the base station 100 generates an almost blank subframe (ABS) pattern and transmits the ABS pattern to the base station 200. Communication between the base stations 100 and 200 may be performed through an X2 interface. The ABS pattern is a subframe pattern including an ABS, and is a pattern having a specific cycle. For example, when a length of a frame is 10 ms and a frame is formed with ten subframes of 1 ms, an ABS pattern may be formed in a 40 ms unit. The ABS may transmit control information (e.g., SIB-1, paging) such as a physical downlink control channel (PDCCH) with limited power (or attenuated power), and is a subframe that transmits control information [e.g., common reference symbols (CRS)], synchronization information [e.g., primary synchronization signals (PSS), secondary synchronization signals (SSS)], and system information [e.g., physical broadcast channel (PBCH)] necessary for a terminal. For example, in an ABS pattern, 1 represents an ABS, and 0 represents a normal subframe rather than an ABS. The normal subframe is a subframe in which transmission power is transmitted.

The base station 100 receives an interference report including an interference value from the terminal 300. When an interference value of the terminal 300 equal to or greater than a threshold value continuously occurs for a predetermined time, the base station 100 instructs an interference control start to the base station 200, generates an ABS pattern, and transmits the ABS pattern to the base station 200. From this time, the base station 100 schedules data transmission and reception using an ABS pattern that the base station 100 generates. The base station 100 does not transmit and receive data in a subframe of 1, but transmits and receives data in a subframe of 0 in the ABS pattern.

The base station 200 schedules data transmission and reception of the terminal 400 in a subframe corresponding to 1 in an ABS pattern based on the ABS pattern that is received from the base station 100, thereby minimizing interference between the terminals 300 and 400.

Figure 2:
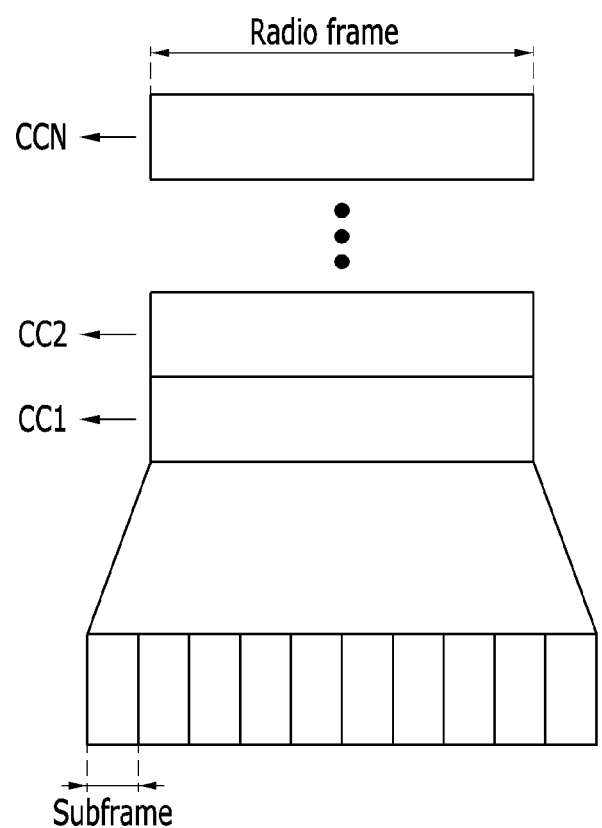
FIG. 2 is a diagram illustrating an example of a radio frame according to an exemplary embodiment of the present invention.

FIG. 2 is a diagram illustrating an example of a radio frame according to an exemplary embodiment of the present invention.

Referring to FIG. 2, the frame has a length of 10 ms and includes 10 subframes. The base stations 100 and 200 manage a plurality of component carriers CC1-CCN, and the terminals 300 and 400 may receive allocation of at least one component carrier from the base stations 100 and 200 to use at least one component carrier. For example, the terminals 300 and 400 may aggregate and use component carriers CC1 and CC2 among the allocated component carriers.

Figure 3:
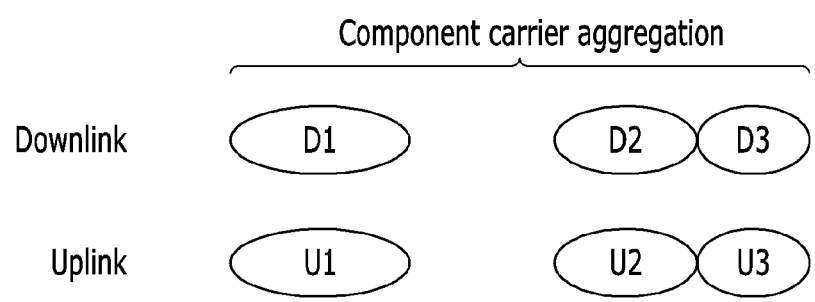
FIG. 3 is a diagram illustrating an example of a downlink component carrier and an uplink component carrier according to an exemplary embodiment of the present invention.

FIG. 3 is a diagram illustrating an example of a downlink component carrier and an uplink component carrier according to an exemplary embodiment of the present invention.

Referring to FIG. 3, a base station may allocate at least one component carrier D1, D2, and D3 for a downlink, and allocate at least one component carrier U1, U2, and U3 for an uplink. In this case, a component carrier that is allocated the downlink is referred to as a downlink component carrier, and a component carrier that is allocated the uplink is referred to as an uplink component carrier. The number of downlink component carriers and the number of uplink component carriers may be the same or different. At least one downlink component carrier is a primary component carrier and the remaining downlink component carriers are secondary component carriers. Similarly, at least one uplink component carrier is a primary component carrier, and the remaining uplink component carriers are secondary component carriers. For example, the downlink component carrier D1 and the uplink component carrier U1 are primary component carriers, and the remaining component carriers D2, U2, D3, and U3 are secondary component carriers.

In an FDD component carrier, downlink component carriers D1, D2, and D3 and uplink component carriers U1, U2, and U3 are connected one-to-one.

The downlink component carrier and the uplink component carrier are connected to form one serving cell. However, a serving cell is not formed with only one uplink component carrier. One of a plurality of serving cells is set to a primary serving cell, and the remaining serving cells are set to a secondary serving cell. The primary serving cell always maintains an active state, and the secondary serving cell is activated or inactivated according to a specific condition. The primary serving cell should have always both uplink and downlink primary component carriers, and the secondary serving cell may have only a downlink secondary component carrier. A primary serving cell may be formed by a primary component carrier, and a secondary serving cell may be formed by a secondary component carrier.

Figure 4:
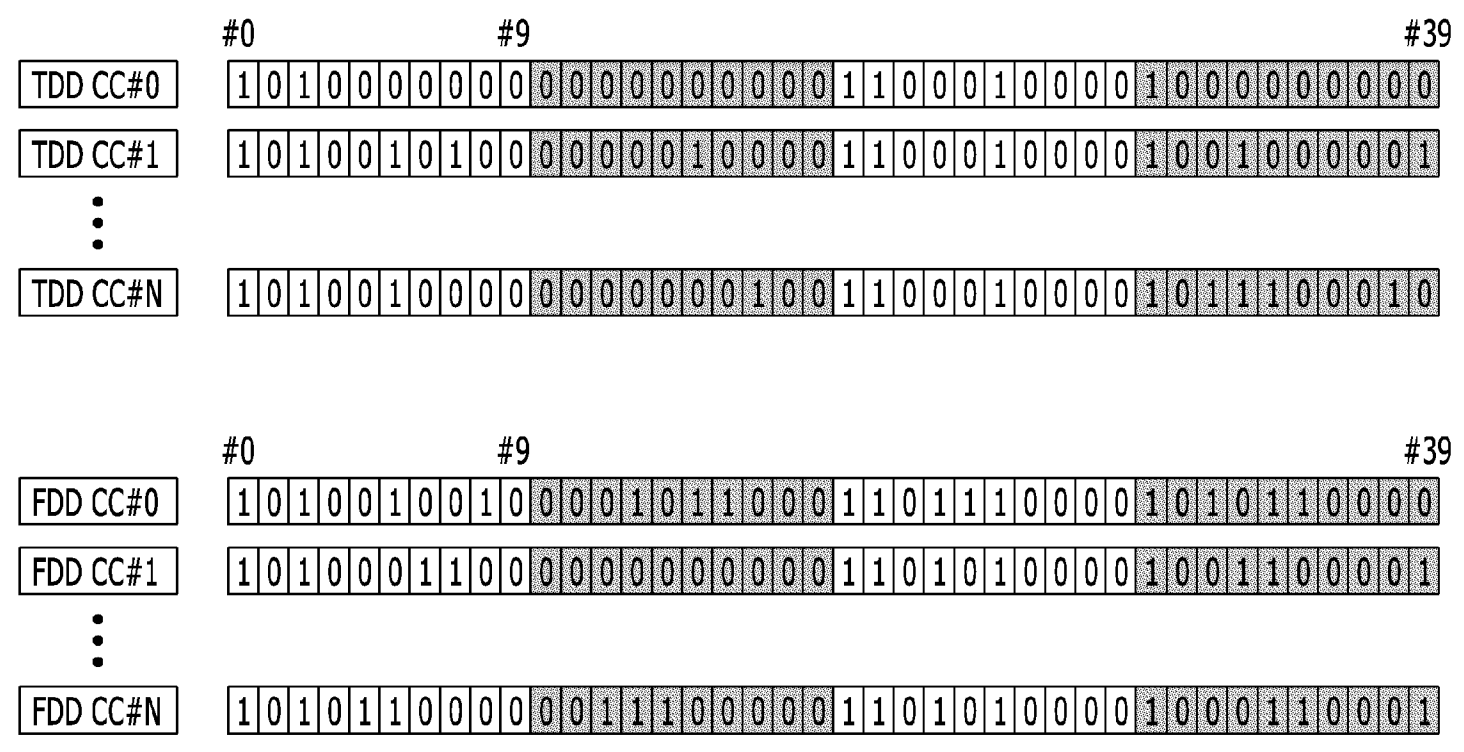

FIG. 4 is a diagram illustrating general ABS pattern information.

As shown in FIG. 4, the base station 100 generates an ABS pattern of each of a plurality of TDD component carriers (TDD CC#0-TDD CC#N) and a plurality of FDD component carriers (FDD CC#0-FDD CC#N).

The ABS pattern may be formed in a 40 ms unit, and is a bit map corresponding to 40 subframes (#0-#39) of a 1 ms unit. In the ABS pattern, 1 represents an ABS, and 0 represents a normal subframe.

In this way, because the base station 100 should generate an ABS pattern of an entire component carrier, much time is consumed in generating the ABS pattern.

Figure 5:
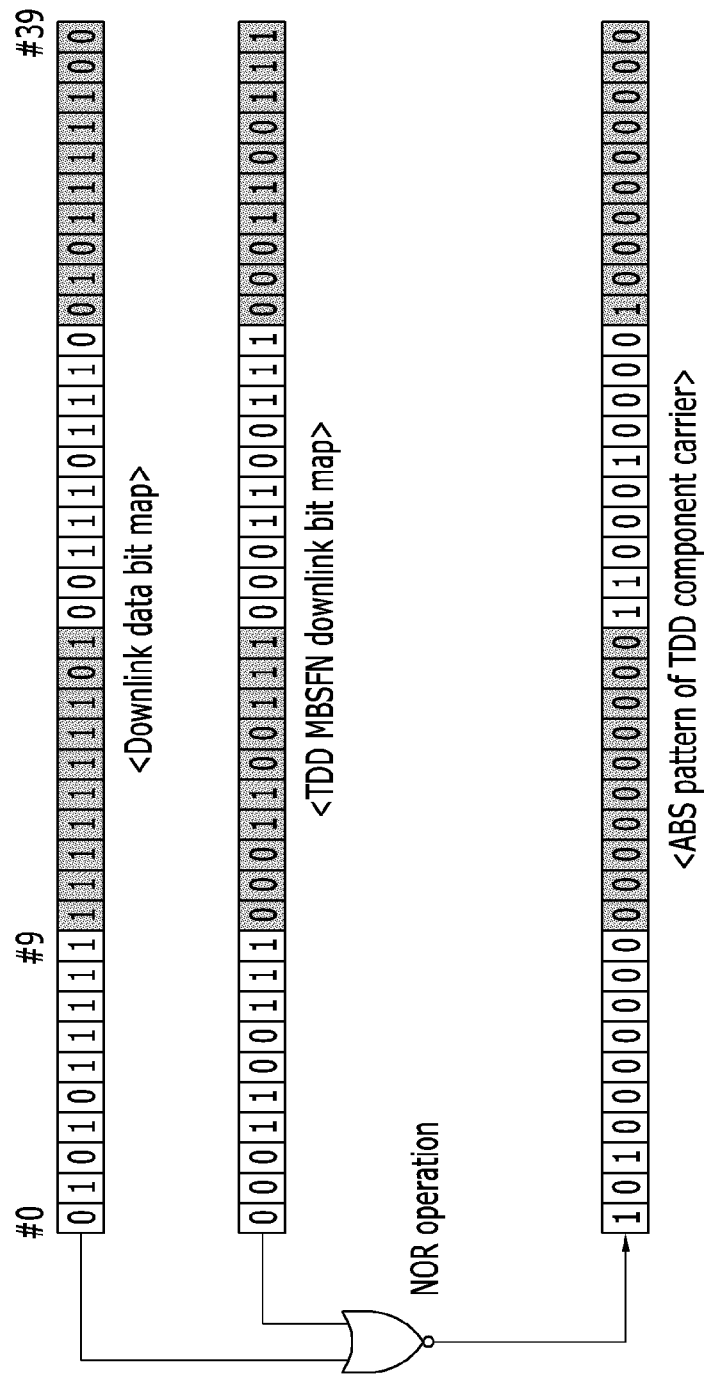
FIG. 5 is a diagram illustrating an example of a method of generating an ABS pattern of a TDD component carrier according to an exemplary embodiment of the present invention.

FIG. 5 is a diagram illustrating an example of a method of generating an ABS pattern of a TDD component carrier according to an exemplary embodiment of the present invention.

Referring to FIG. 5, the base station 100 generates a downlink data bit map based on downlink data transmission for 4 previous frames. For this reason, the base station 100 stores a history of downlink data transmission for 4 previous frames. A size of a frame to store, i.e., a bit map size, is fixed to 4 frames (=40 subframes) in an FDD, but is variably dependent as 2 frames (=20 subframes), 6 frames (=60 subframes), or 7 frames (=70 subframe) according to a configuration in a TDD. In a bit map, 1 indicates that data is transmitted, and 0 indicates that no data is transmitted.

When both base stations 100 and 200 provide a multimedia broadcast multicast service (MBMS) within one service region, an MBMS single frequency network (MBSFN) subframe for the MBMS is allocated. That is, in the MBSFN subframe, both base stations transmit the same data in the same format at the same time. Such an MBSFN subframe is previously determined in each of TDD and FDD radio frames. Therefore, the base station 100 generates a TDD MBSFN downlink bit map based on a TDD MBSFN subframe.

The base station 100 generates an ABS pattern of a TDD component carrier using a downlink data bit map and a TDD MBSFN downlink bit map. For example, the base station 100 may perform a NOR operation of each bit of a downlink data bit map and each bit of a TDD MBSFN downlink bit map, and generate an ABS pattern of a TDD component carrier. That is, the base station 100 compares each bit of a downlink data bit map and each bit of a TDD MBSFN downlink bit map and sets 1 which represents an ABS, when both each bits are 0, and sets 0 which represents a normal subframe in other cases.

Figure 6:
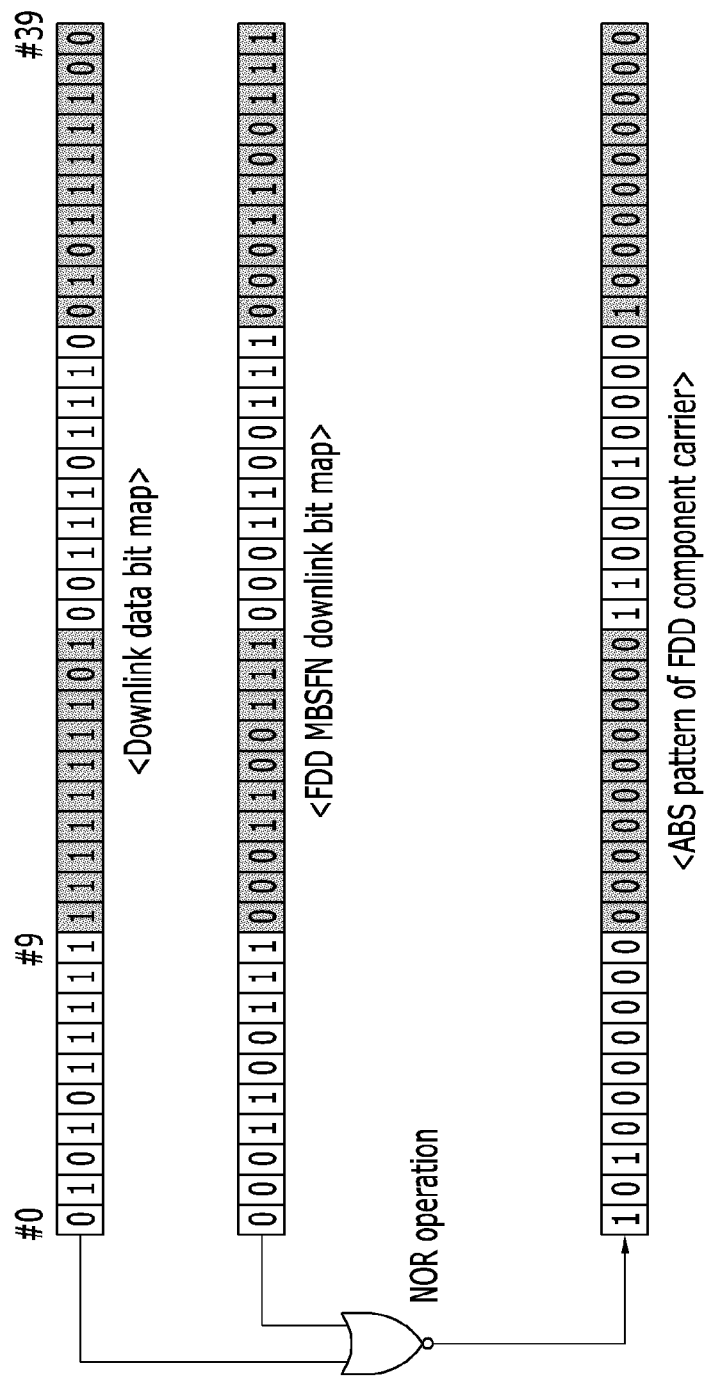
FIG. 6 is a diagram illustrating an example of a method of generating an ABS pattern of an FDD component carrier according to an exemplary embodiment of the present invention.

FIG. 6 is a diagram illustrating an example of a method of generating an ABS pattern of an FDD component carrier according to an exemplary embodiment of the present invention.

Referring to FIG. 6, the base station 100 generates an ABS pattern of an FDD component carrier with the same method as a method of generating an ABS pattern of a TDD component carrier. That is, the base station 100 generates a downlink data bit map based on downlink data transmission for 4 previous frames. Further, the base station 100 generates an FDD MBSFN downlink bit map based on an FDD MBSFN subframe.

The base station 100 may perform a NOR operation of each bit of a downlink data bit map and each bit of an FDD MBSFN downlink bit map, and generate an ABS pattern of an FDD component carrier. That is, the base station 100 compares each bit of a downlink data bit map and each bit of an FDD MBSFN downlink bit map and sets 1 which represents ABS, when both each bits are 0, and sets 0 which represents a normal subframe in other cases.

Figure 7:
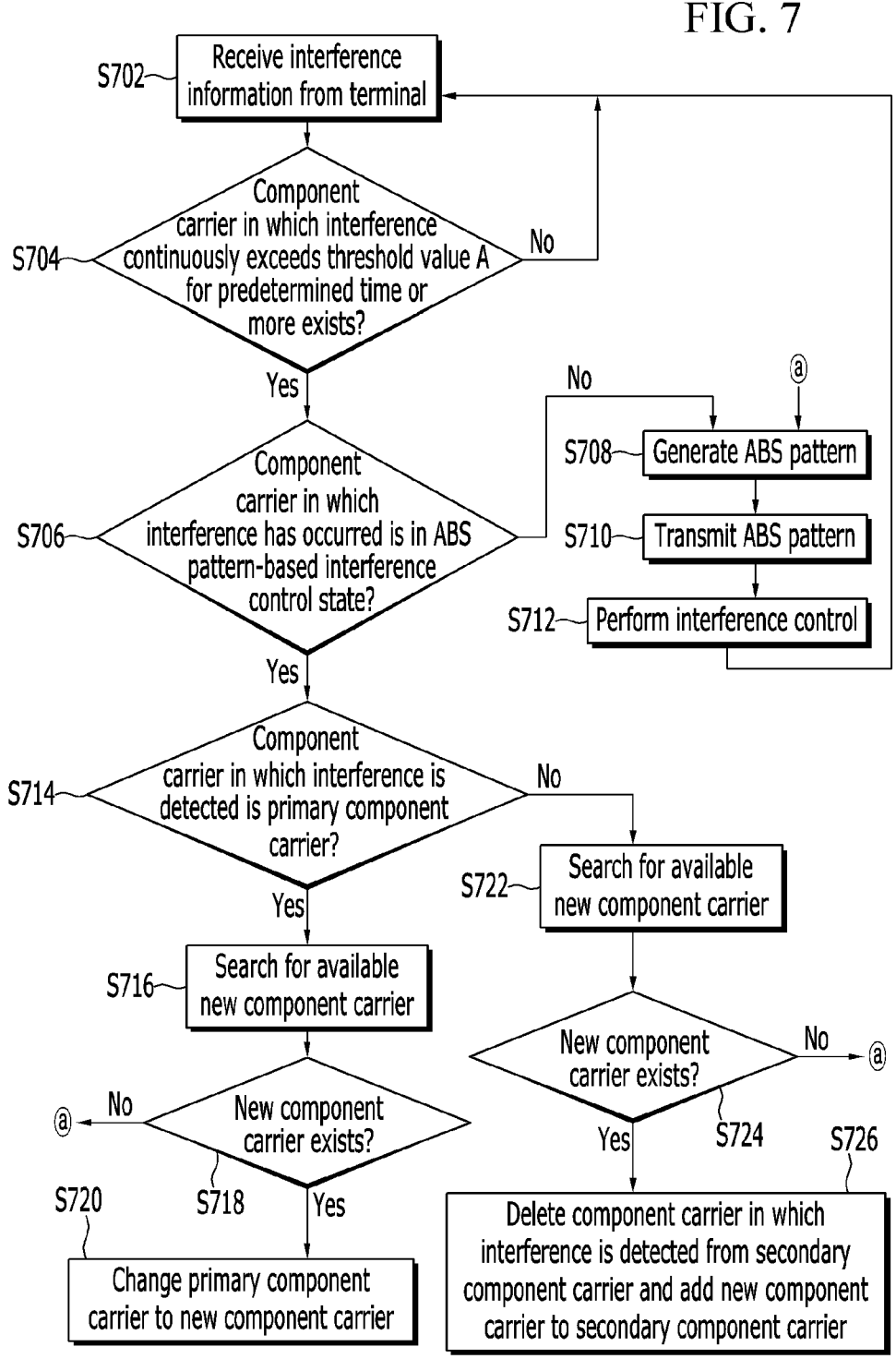
FIG. 7 is a flowchart illustrating a method of controlling interference according to an exemplary embodiment of the present invention.

FIG. 7 is a flowchart illustrating a method of controlling interference according to an exemplary embodiment of the present invention.

Referring to FIG. 7, the base station 100 receives interference information of TDD and FDD component carriers from the terminal 300 (S702).

The base station 100 determines whether a component carrier in which interference continuously exceeds a threshold value A for a predetermined time or more exists based on interference information of TDD and FDD component carriers that are received from the terminal 300 (S704).

If a component carrier in which interference continuously exceeds a threshold value A for a predetermined time or more exists, the base station 100 determines whether a component carrier in which interference has occurred is in an ABS pattern-based interference control state (S706). That is, the base station 100 determines whether a component carrier in which interference has occurred is in a state that performs interference control using an ABS pattern.

If a component carrier in which interference has occurred is not in an ABS pattern-based interference control state, the base station 100 starts interference control of a component carrier in which interference has occurred using an ABS pattern. That is, the base station 100 generates an ABS pattern to apply a component carrier in which interference has occurred (S708), as in a method described with reference to FIG. 5 or 6.

The base station 100 transmits the generated ABS pattern to a neighboring base station (e.g., 200) (S710).

Further, the base station 100 schedules data transmission and reception of a component carrier in which interference has occurred using the generated ABS pattern, thereby performing interference control (S712).

If a component carrier in which interference has occurred is in an ABS pattern-based interference control state at step S706, the base station 100 determines whether a component carrier in which interference is detected is a primary component carrier (S714).

If a component carrier in which interference is detected is a primary component carrier, the base station 100 searches for an available new component carrier (S716).

The base station 100 determines whether a new component carrier exists (S718), and if a new component carrier exists, the base station 100 changes the primary component carrier to the new component carrier (S720). The primary component carrier may be changed through handover. If a component carrier in which interference is detected is not a primary component carrier at step S714 (i.e., if a component carrier in which interference is detected is a secondary component carrier), the base station 100 searches for an available new component carrier (S722).

The base station 100 determines whether a new component carrier exists (S724), and if a new component carrier exists, the base station 100 deletes a component carrier in which interference is detected from a secondary component carrier and adds the new component carrier to the secondary component carrier and uses it (S726).

If a new component carrier does not exist at steps S716 and 724, the base station 100 newly generates an ABS pattern corresponding to a component carrier in which interference has occurred (S708), as in a method described with reference to FIG. 5 or 6, and performs ABS pattern-based interference control through steps S710-S712.

Figure 8:
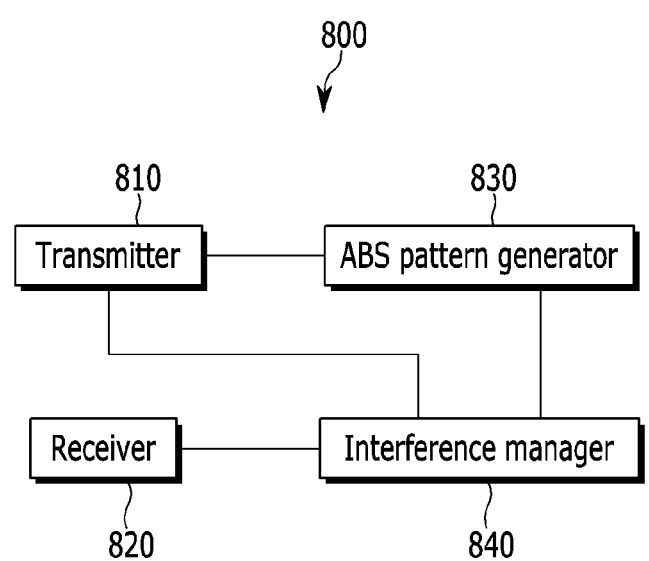
FIG. 8 is a block diagram illustrating a configuration of an interference control apparatus according to an exemplary embodiment of the present invention.

FIG. 8 is a block diagram illustrating a configuration of an interference control apparatus according to an exemplary embodiment of the present invention.

Referring to FIG. 8, an interference control apparatus 800 includes a transmitter 810, a receiver 820, an ABS pattern generator 830, and an interference manager 840. Such an interference control apparatus 800 may be implemented within the base stations 100 and 200.

The transmitter 810 transmits ABS pattern information to a neighboring base station. The ABS pattern information may include an ABS pattern of TDD and FDD component carriers. The transmitter 810 may transmit allocation information about a component carrier of a terminal to the terminal.

The receiver 820 receives interference information from the terminal.

The ABS pattern generator 830 generates an ABS pattern of TDD and FDD component carriers. The ABS pattern generator 830 may generate an ABS pattern of TDD and FDD component carriers, as described with reference to FIG. 5 or 6.

The interference manager 840 manages a plurality of component carriers and allocates a component carrier of the terminal. The interference manager 840 performs interference control based on the generated ABS pattern of a component carrier in which interference is detected. Further, a neighboring base station may also perform interference control based on an ABS pattern.

The interference manager 840 performs interference control based on the ABS pattern, and even after a predetermined time has elapsed, when interference of a corresponding component carrier is not removed, the interference manager 840 changes a component carrier in which interference is detected to an available new component carrier. In this case, when a component carrier in which interference is detected is a primary component carrier, the interference manager 840 changes a primary component carrier to a new component carrier, and when a component carrier in which interference is detected is a secondary component carrier, the interference manager 840 deletes a component carrier in which interference is detected and adds and uses a new component carrier to a secondary component carrier.

In the foregoing carrier aggregation system according to an exemplary embodiment of the present invention, at least a partial function of a method and apparatus for controlling interference may be implemented with hardware or software that is combined to hardware. For example, a processor that is implemented with a central processing unit (CPU) or other chipset and microprocessor may perform a function of the ABS pattern generator 830 and the interference manager 840, and a transceiver may perform a function of the transmitter 810 and the receiver 820.

According to an exemplary embodiment of the present invention, when a base station and a terminal aggregate and use several FDD component carriers and TDD component carriers, an ABS pattern can be generated and used at a high speed, and interference that is not solved with only an ABS pattern can be reduced.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a base station of a carrier aggregation system that aggregates and communicates with a plurality of component carriers controls interference between terminals, the method comprising:
   determining whether a component carrier in which interference exceeds a threshold value exists in the plurality of component carriers;
   performing an almost blank subframe (ABS) pattern-based interference control of a first component carrier in which interference that exceeds the threshold value has occurred; and
   changing, if interference of the first component carrier exceeds the threshold value after the interference control, the first component carrier to an available new component carrier,
   wherein the performing of the ABS pattern-based interference control comprises:
   generating a downlink data bit map based on downlink data transmission for continuous frames immediately preceding the generation of the downlink data bit map;
   generating an MBSFN downlink bit map based on an MBMS single frequency network (MBSFN) subframe that is allocated for a multimedia broadcast multicast service (MBMS); and
   generating an ABS pattern by comparing each bit of the downlink data bit map and each bit of the MBSFN downlink bit map.

2. The method of claim 1, wherein the changing of the first component carrier comprises changing, when the first component carrier is a primary component carrier, the first component carrier to the available new component carrier through handover.

3. The method of claim 1, wherein the changing of the first component carrier comprises removing, when the first component carrier is a secondary component carrier, the first component carrier and using the available new component carrier as the secondary component carrier.

4. The method of claim 1, wherein the plurality of component carriers comprise a plurality of frequency division duplex (FDD) component carriers operating with an FDD method and a plurality of time division duplex (TDD) component carriers operating with a TDD method, and
   the ABS pattern comprises a first ABS pattern of the plurality of FDD component carriers and a second ABS pattern of the plurality of TDD component carriers.

5. The method of claim 1, wherein the performing of an almost blank subframe (ABS) pattern-based interference control comprises scheduling a terminal that is connected to the base station at a subframe segment instead of an ABS based on information of the ABS pattern.

6. The method of claim 1, wherein the performing of the ABS pattern-based interference control further comprises transmitting the ABS pattern to a neighboring base station.

7. The method of claim 6, wherein the performing of the ABS pattern-based interference control further comprises scheduling, by the neighboring base station, a terminal that is connected to the neighboring base station at a segment corresponding to an ABS based on information of the ABS pattern.

8. The method of claim 6, wherein the generating of the ABS pattern comprises determining each bit of the ABS pattern by performing a NOR operation of each bit of the downlink data bit map and each bit of the MBSFN downlink bit map.

9. The method of claim 6, wherein each bit of the downlink data bit map and the MBSFN downlink bit map represents whether data is transmitted in each subframe corresponding to the each bit.

10. An interference control apparatus that controls interference between terminals in a carrier aggregation system that aggregates and communicates with a plurality of component carriers, the interference control apparatus comprising:
   a receiver that receives interference information in a plurality of component carriers that are allocated to a terminal from the terminal; and
   an interference manager that performs interference control based on an almost blank subframe (ABS) pattern of a first component carrier in which interference exceeds a threshold value among the plurality of component carriers, and that changes the first component carrier to an available new component carrier when interference of the first component carrier exceeds the threshold value; and
   an ABS pattern generator that generates a downlink data bit map based on downlink data transmission for continuous frames immediately preceding the generation of the downlink data bit map, that generates an MBSFN downlink bit map based on an MBMS single frequency network (MBSFN) subframe that is allocated for a multimedia broadcast multicast service (MBMS), and that generates each bit of the ABS pattern by comparing each bit of the downlink data bit map and each bit of the MBSFN downlink bit map.

11. The interference control apparatus of claim 10, wherein the interference manager changes a primary component carrier to the available new component carrier when the first component carrier is a primary component carrier.

12. The interference control apparatus of claim 10, wherein the interference manager removes the first component carrier, when the first component carrier is a secondary component carrier and uses the available new component carrier as the secondary component carrier.

13. The interference control apparatus of claim 10, wherein the plurality of component carriers comprise a plurality of frequency division duplex (FDD) component carriers operating with an FDD method and a plurality of time division duplex (TDD) component carriers operating with a TDD method, and
the ABS pattern comprises a first ABS pattern of the plurality of FDD component carriers and a second ABS pattern of the plurality of TDD component carriers.

14. The interference control apparatus of claim 13, wherein the interference manager performs interference control using the first ABS pattern when the first component carrier is an FDD component carrier, and performs interference control using the second ABS pattern when the first component carrier is a TDD component carrier.

15. The interference control apparatus of claim 10, wherein the ABS pattern generator determines each bit of the ABS pattern according to a NOR operation result of each bit of the downlink data bit map and each bit of the MBSFN downlink bit map.

16. The interference control apparatus of claim 10, wherein the interference manager schedules downlink transmission and uplink transmission of a terminal that is connected to the base station at a subframe segment instead of an ABS based on the ABS pattern.

17. The interference control apparatus of claim 16, further comprising a transmitter that transmits the ABS pattern to a neighboring base station,
wherein the neighboring base station schedules downlink transmission and uplink transmission of a terminal that is connected to the neighboring base station at a segment corresponding to an ABS based on the ABS pattern.

* * * * *